United States Patent
Hidaka et al.

(10) Patent No.: US 12,203,558 B2
(45) Date of Patent: Jan. 21, 2025

(54) CASING FOR FLUID CONTROLLER AND FLUID CONTROLLER PROVIDED WITH SAME

(71) Applicant: FUJIKIN INCORPORATED, Osaka (JP)

(72) Inventors: Atsushi Hidaka, Osaka (JP); Takatoshi Nakatani, Osaka (JP); Kazuyuki Morisaki, Osaka (JP); Tomokazu Hirota, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 18/246,823

(22) PCT Filed: Oct. 18, 2021

(86) PCT No.: PCT/JP2021/038441
§ 371 (c)(1),
(2) Date: Mar. 27, 2023

(87) PCT Pub. No.: WO2022/091841
PCT Pub. Date: May 5, 2022

(65) Prior Publication Data
US 2023/0400114 A1 Dec. 14, 2023

(30) Foreign Application Priority Data

Oct. 31, 2020 (JP) .................................. 2020-183374

(51) Int. Cl.
*F16K 27/12* (2006.01)
*F16K 27/02* (2006.01)
*F16K 31/00* (2006.01)

(52) U.S. Cl.
CPC .......... *F16K 27/12* (2013.01); *F16K 27/0236* (2013.01); *F16K 31/007* (2013.01)

(58) Field of Classification Search
CPC .... F16K 27/00; F16K 27/0236; F16K 27/029; F16K 27/12; F16K 31/004; F16K 31/007;
(Continued)

(56) References Cited

U.S. PATENT DOCUMENTS

| 1,690,461 | A | * | 11/1928 | Sieben | ................... F16K 17/38 |
|---|---|---|---|---|---|
| | | | | | 137/382 |
| 4,597,122 | A | * | 7/1986 | Handler | ................. A47B 88/41 |
| | | | | | 5/503.1 |

(Continued)

FOREIGN PATENT DOCUMENTS

| JP | H11-353030 A | 12/1999 |
|---|---|---|
| JP | 2003-120832 A | 4/2003 |

(Continued)

OTHER PUBLICATIONS

An Office Action mailed by the Korean Intellectual Property Office on May 22, 2024, which corresponds to Korean Patent Application No. 10-2023-7003433 and is related to U.S. Appl. No. 18/246,823; with English language translation.

(Continued)

*Primary Examiner* — Kevin F Murphy
*Assistant Examiner* — Jonathan J Waddy
(74) *Attorney, Agent, or Firm* — Studebaker & Brackett PC

(57) ABSTRACT

[Problem] The main purpose of the present invention is to provide a casing for a fluid controller capable of enabling maintenance inside the casing even in a state where the lower part of the casing is fixed to a main body of a fluid controller, and improving maintainability.
[Solution] A casing 1 for covering devices 104,106,108 on a main body 101 of a fluid controller 100, the casing 1 is
(Continued)

configured so as to be dividable into a plurality of parts, and the plurality of parts comprising a first part 2 provided with a fixing portion 2i for fixing to the main body 101, a second part 4 attached to the first part 2, and a third part 5 attachably and detachably provided at an upper partition higher than a predetermined height position of the casing 1.

9 Claims, 11 Drawing Sheets

(58) Field of Classification Search
CPC ........ F16K 31/008; G06F 1/16; G06F 1/1675; Y10T 137/7043; Y10T 137/7062
USPC ............................... 137/375, 377, 382, 382.5
See application file for complete search history.

(56) References Cited

U.S. PATENT DOCUMENTS

| | | | |
|---|---|---|---|
| 2003/0019885 A1* | 1/2003 | Luehrsen | B01F 33/84 222/94 |
| 2006/0170314 A1* | 8/2006 | Ricker | F04C 23/00 312/290 |
| 2010/0127196 A1 | 5/2010 | Sawada et al. | |
| 2012/0298220 A1 | 11/2012 | Hidaka et al. | |
| 2013/0340857 A1* | 12/2013 | Crochet, Sr. | F16K 27/12 29/428 |
| 2016/0369910 A1* | 12/2016 | Kluz | H02N 2/0055 |
| 2017/0268680 A1* | 9/2017 | Kim | F16K 3/184 |
| 2019/0195382 A1* | 6/2019 | Scheibe | F16K 31/0682 |
| 2021/0396329 A1* | 12/2021 | Mita | H01F 7/127 |
| 2023/0332714 A1* | 10/2023 | Tsujino | F16K 37/0041 |

FOREIGN PATENT DOCUMENTS

| | | |
|---|---|---|
| JP | 2008-249002 A | 10/2008 |
| KR | 10-0623086 B1 | 9/2006 |
| WO | 2011/067877 A1 | 6/2011 |

OTHER PUBLICATIONS

International Search Report issued in PCT/JP2021/038441; mailed Nov. 30, 2021.

* cited by examiner

CASING FOR FLUID CONTROLLER AND FLUID CONTROLLER PROVIDED WITH SAME

TECHNICAL FIELD

The present invention relates to a casing for a fluid controller and a fluid controller having the same.

BACKGROUND ART

Conventionally, a fluid controller comprising a rectangular-shaped main body with a flow path formed therein, sensors attached to the main body for detecting a pressure or a temperature or the like in the flow path, and a control valve disposed on the main body for opening/closing the flow path in accordance with the detected value of the sensors, is well known (Patent Literature 1 to 4, etc.). As the control valve, a piezoelectric driving valve for opening/closing control of a diaphragm valve element by utilizing expansion and contraction of a piezo actuator having a built-in laminated piezoelectric element is known. A casing is mounted on the main body to cover the control valve or the like on the main body.

FIG. 9 is a sectional view illustrating an example of a conventional fluid controller (FIG. 1 of Patent Literature 3). The fluid controller 100 illustrated in FIG. 9 is provided with a main body 101 formed with a flow path 102, a diaphragm valve element 103 interposed in the flow path 102, a piezo actuator 104 for opening/closing the diaphragm valve element 103, a throttling mechanism 105 interposed in the flow path 102 downstream of the diaphragm valve element 103, a pressure sensor 106 for detecting a pressure in the flow path 102 between the diaphragm valve element 103 and the throttling mechanism 105. A casing 107 is attached to the main body 101.

Under the pressure condition that an absolute pressure (P1) upstream of the throttling mechanism 105 is more than twice a pressure (P2) downstream of the throttling mechanism 105, the flow speed of a gas passing through the throttling mechanism 105 becomes the sonic velocity. That is, the flow rate Q of the gas passing through the throttling mechanism 105 such as an orifice, is proportional only to the upstream absolute pressure (P1) because the velocity of the orifice portion of the throttling mechanism 105 is invariant at the sonic velocity. This principle is called critical expansion condition, and this type of fluid controller 100 controls the flow rate with high accuracy by utilizing this principle. Although the fluid controller shown in FIG. 9 illustrates an example in which the pressure sensor 106 is provided only upstream of the throttling mechanism 105, as in the example shown in FIG. 10, a pressure sensor 108 may be added also downstream of the throttling mechanism 105 to detect a downstream fluid pressure (P2). In FIG. 10, the same components are denoted by the same reference numerals as in FIG. 9.

When the piezoelectric driving valve having a piezo actuator is under maintenance or the like, an operation stroke of the diaphragm valve element by the laminated piezoelectric element may be adjusted as necessary. The adjustment of the operation stroke is performed by adjusting the amount of tightness of an adjustment cap-nut 104c screwed to the upper portion of a case 104b in which the laminated piezoelectric element 104a is accommodated. Such adjustment is described in detail in JP 2003-120832 and JP 2008-249002, which are incorporated by reference.

In addition, in this type of fluid controller, when the fluid passing through the fluid controller is a high-temperature fluid, in order to keep the fluid under control at a predetermined temperature, as shown in FIG. 11, the main body of the fluid controller fixed with the casing 107 is covered by a heat-insulating material 109 such as a jacket heater. It is described in detail in International Publication No. WO2011/067877, which is incorporated by reference.

PRIOR-ART DOCUMENT

Patent Literature

Patent Literature 1: Japanese Patent Application Laid-Open Publication No. H11-353030
Patent Literature 2: Japanese Patent Application Laid-Open Publication No. 2003-120832, paragraph 0028, FIG. 1
Patent literature 3: Japanese Patent Application Laid-Open Publication No. 2008-249002, paragraph 0029, paragraph 0048, FIGS. 1 to 3, FIG. 9, FIG. 10
Patent Literature 4: International Publication No. WO2011/067877 publication brochure, FIG. 11

SUMMARY OF INVENTION

Technical Problem

Conventionally, in order to perform maintenance such as stroke adjustment of the piezoelectric drive valve, it is necessary to remove the casing from the main body of the fluid controller. Since the casing is generally fixed by screwing a lower portion of the casing to a side surface of the main body, when the main body of the fluid controller is covered by a heat insulating material such as a jacket heater, the jacket heater had to be removed before removing the casing, which results in poor work efficiency. In addition, even when maintenance such as stroke adjustment of the piezoelectric drive valve needs to be performed while maintaining the temperature in the casing at a predetermined temperature by the heat insulating material such as a jacket heater, rapid temperature drop in the casing by removing the fixed lower portion of the casing from the main body of the fluid controller makes it difficult to perform the adjustment or the like in consideration of the temperature characteristics.

The main object of the present invention is to provide a casing for a fluid controller and a fluid controller having the casing for a fluid controller capable of enabling the maintenance inside of the casing even in a state where the lower portion of the casing is fixed to the main body of the fluid controller, and improving maintainability.

Solution to Problem

In order to solve the above conventional problem, in one embodiment, the casing for a fluid controller according to the present invention is a casing for a fluid controller to cover devices on a main body of the fluid controller, comprising a first part provided with a fixing portion for fixing the casing to the main body, a second part attached to the first part, and a third part attachably and detachably arranged at an upper portion higher than a predetermined height position of the casing, wherein the casing is configured to be dividable into the first part, the second part, and the third part.

In one embodiment, the first part is one part obtained by longitudinally dividing the casing for a fluid controller into two parts, the second part and the third part are upper and lower dividable parts of the other part of the casing for a fluid controller divided by the first part, and the third part is arranged on top of the second part.

In one embodiment, the first part is configured to be dividable into a fourth part provided with the fixing portion, and a fifth part attachably and detachably arranged on top of the fourth part.

In one embodiment, height dimensions of the third part and the fifth part are different.

In one embodiment, the first part is provided with a locked portion, the second part is provided with a locking portion for detachably attaching the second part to the first part by engaging the locked portion. The locking portion is configured to engage the locked portion by sliding the second part downward along the first part, and to disengaged the engagement by sliding the second part upward along the first part.

In one embodiment, the first part is a lower part by dividing the casing for a fluid controller into an upper and the lower part, the second part and the third part are parts by longitudinally dividing the upper portion of the casing for a fluid controller that is divided by the first part.

In one embodiment, the first part and the second part are detachably attached by engagement, the engagement being configured so as to not disengage by fixing the third part to either the first part or the second part.

Furthermore, in order to solve the above conventional problem, the casing for a fluid controller according to the present invention comprises a main body having a flow path formed therein, devices for fluid control mounted on the main body, and a casing for a fluid controller according to any one of the embodiments of the present invention, for covering the devices fixed to the main body.

Effect of Invention

According to the present invention, by dividing the casing for a fluid controller into a first part fixed to the main body of the fluid controller and another part, further dividing the other part into a second part and a third part, and making the third part detachable arranged at the upper portion of the casing, maintenance of the inside of the casing can be performed by removing only the third part.

DESCRIPTION OF EMBODIMENTS

Figure 1:
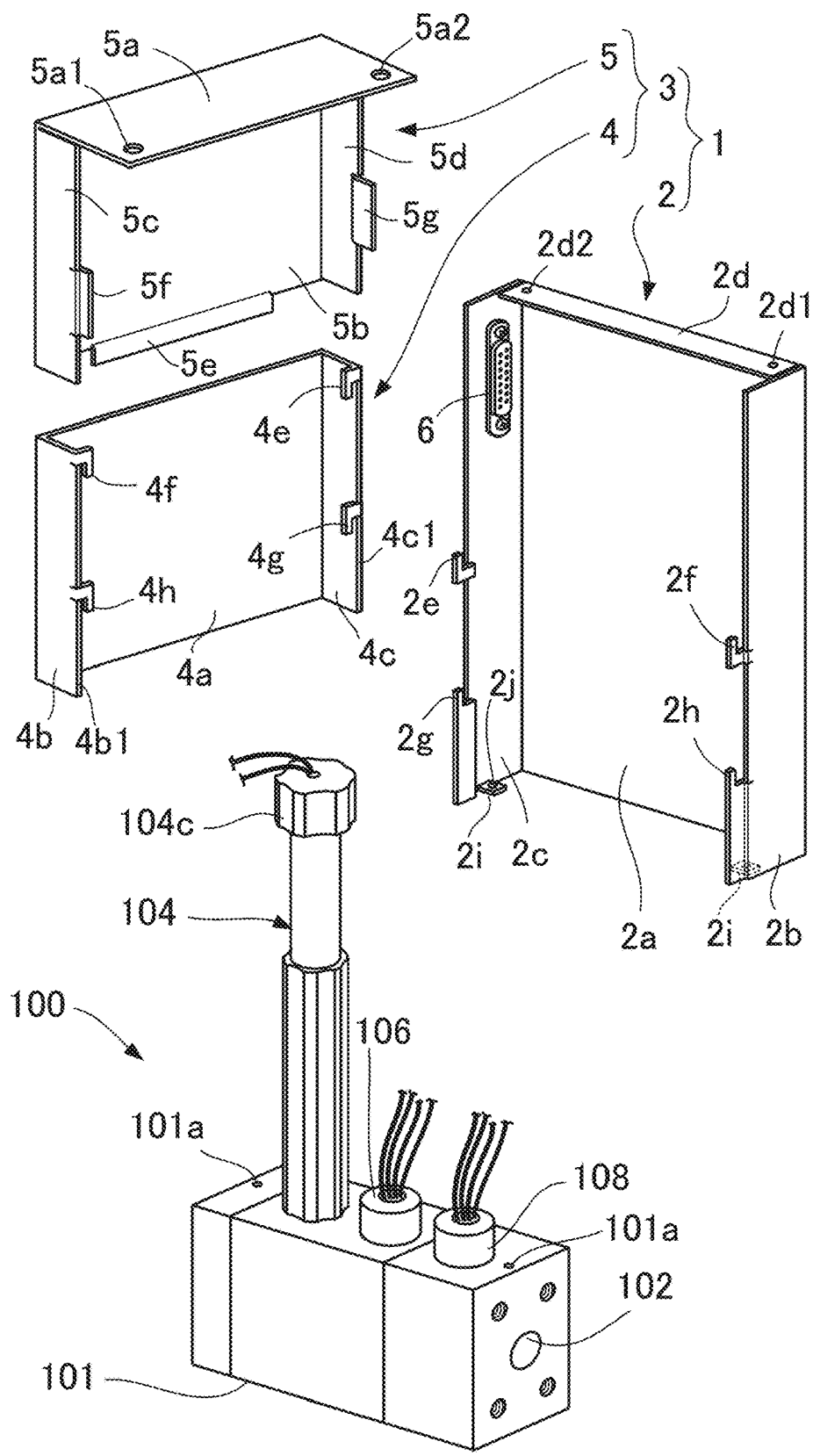
FIG. 1 is an exploded perspective view of a casing for a fluid controller with a fluid controller shown in the first embodiment according to the present invention.

Embodiments of a casing for a fluid controller according to the present invention will be described below with reference to FIGS. 1 to 8. Identical or similar components throughout all figures and embodiments, including those in the prior arts, are denoted by the same reference numerals.

The first embodiment of the casing for a fluid controller according to the present invention will be described with reference to FIGS. 1 to 4. A casing for a fluid controller 1 is configured to be dividable into a first part 2 to be fixed to a main body 101 of a fluid controller 100, a second part 4 to be attached to the first part 2, and a third part 5 to be removably arranged at the upper portion of the second part 4.

The first part 2 is one part by longitudinally dividing the casing for a fluid controller 1. The second part 4 and the third part 5 are parts by dividing the other part 3 of the casing for a fluid controller 1, which was longitudinally divided by the first part 2, into upper and lower portions. The third part 5 is arranged on top of the second part 4.

Figure 9:
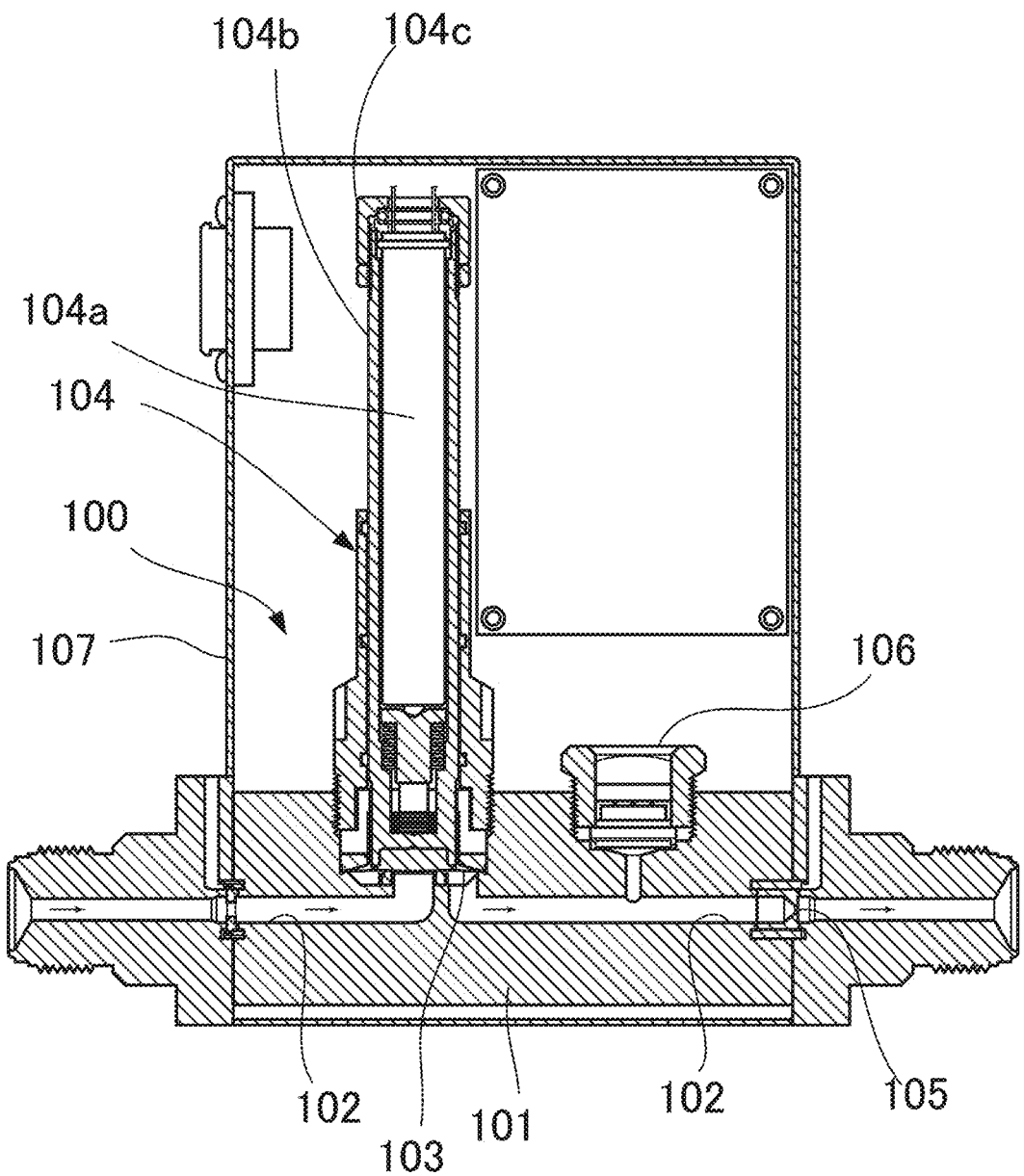
FIG. 9 is a cross-sectional view of a fluid controller attached with a conventional casing.
Figure 10:
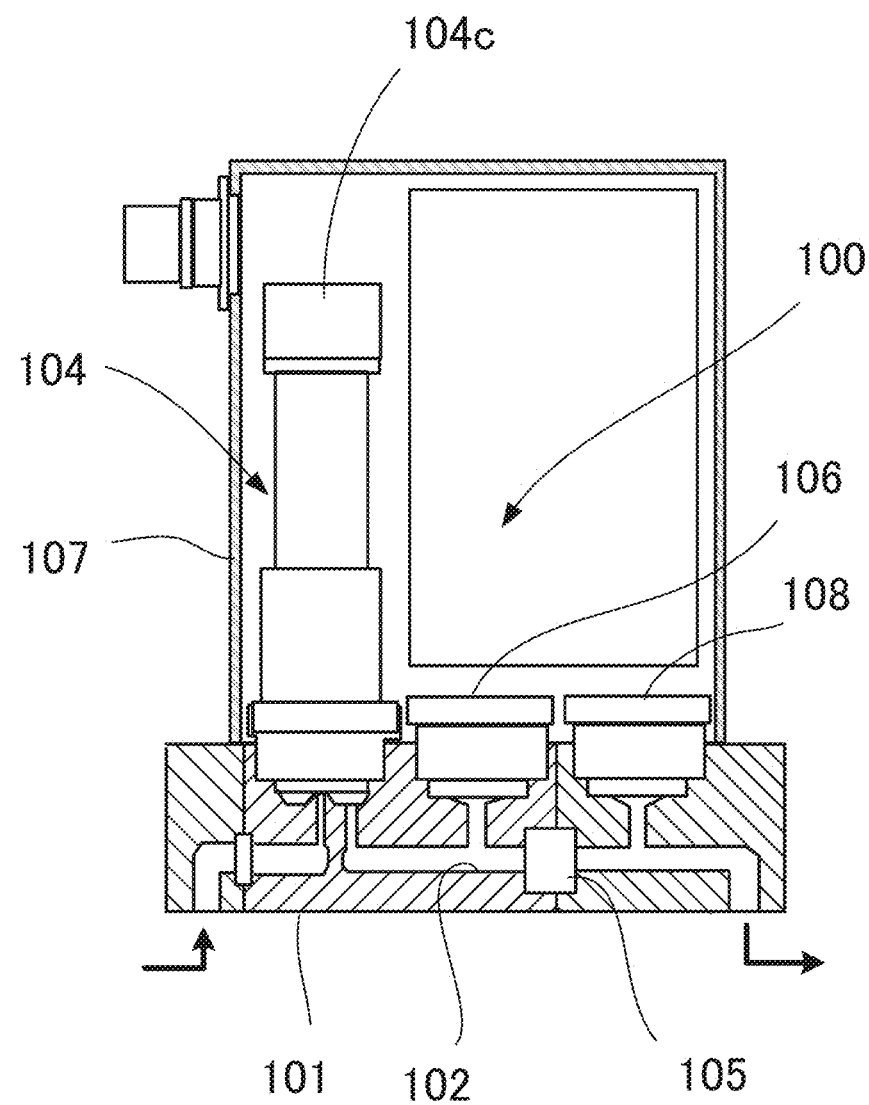
FIG. 10 is a cross-sectional view of a fluid controller attached with a conventional casing.
Figure 11:
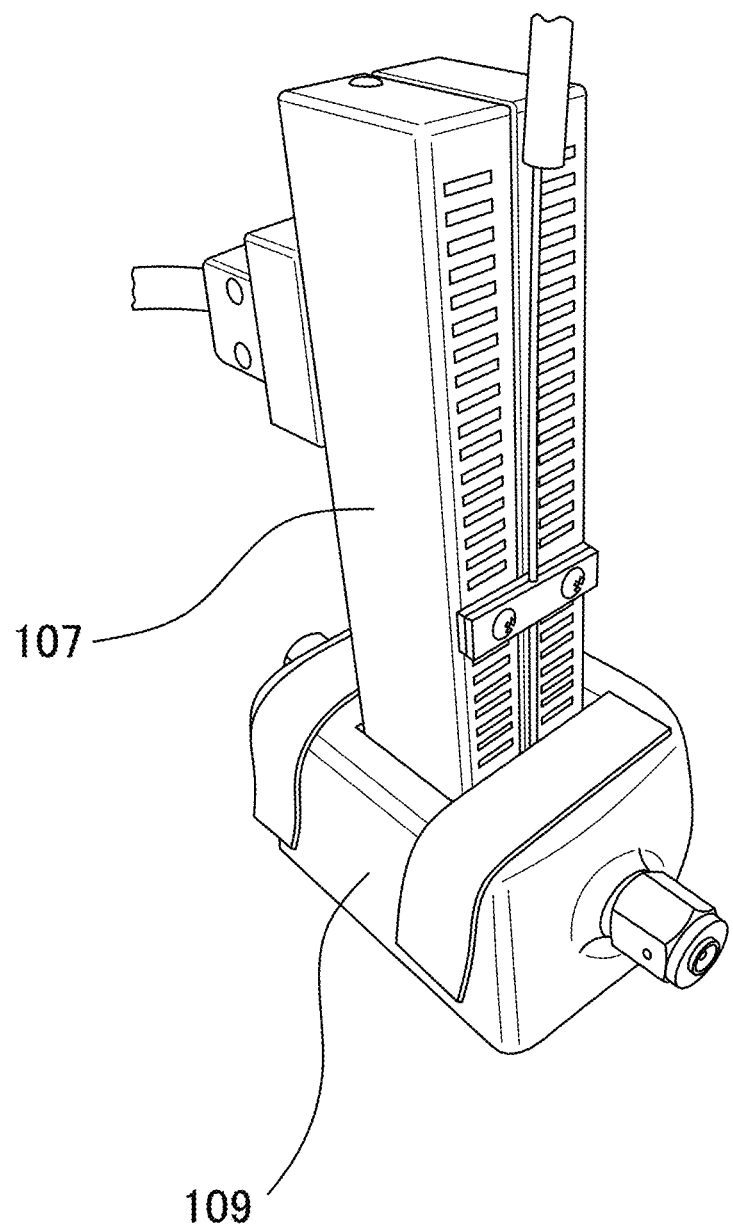
FIG. 11 is a perspective view of a fluid controller attached with a conventional casing for a fluid controller, showing an example of covering the fluid controller main body with a heat insulating material.

In the fluid controller 100, devices for fluid control such as a piezo actuator 104, and pressure sensors 106 and 108, are mounted on the main body 101 with a flow path 102 formed therein (reference FIG. 9), and covered by the casing for a fluid controller 1. An adjustment cap-nut 104c is screwed to an upper portion of the piezo actuator 104. Since this type of fluid controller 100 is conventionally known as described above, a detailed description of the internal structure or the like will be mitted. A connector 6 is attached to the first part 2 for connecting electrical wirings of the piezo actuator 104 and the pressure sensors 106, 108. Only a part of the electrical wirings is shown, the remaining part is omitted.

Figure 2:
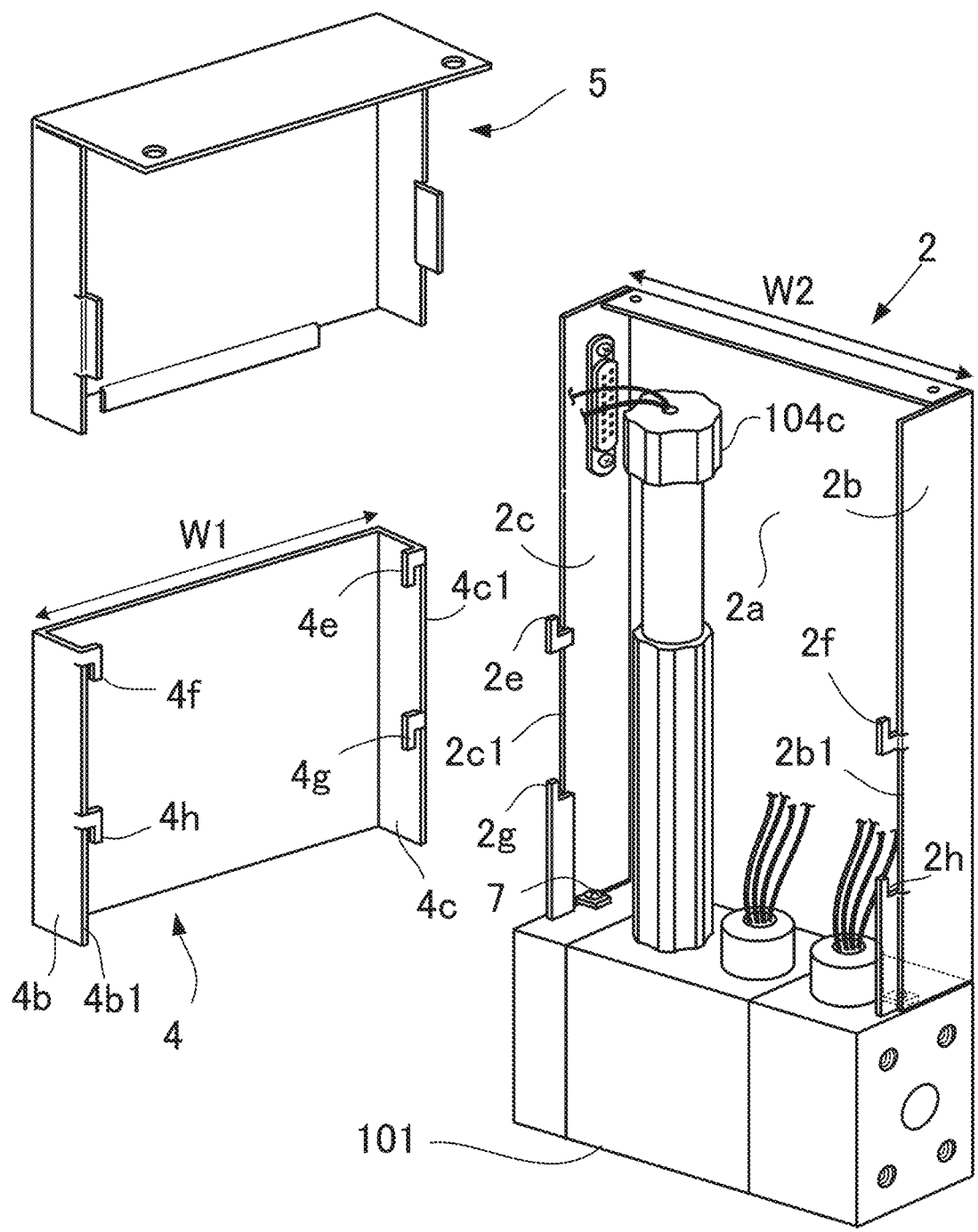
FIG. 2 is an exploded perspective view showing another exploded state of the casing for a fluid controller of FIG. 1.

The first part 2 is provided with a backplate 2a, left and right side plates 2b, 2c, an upper stay 2d, hook-shaped locked portions 2e, 2f, 2g, 2h, and a seat plate which configures a fixing portion 2i for being fixed to the main body 101. The first part 2 is formed by cutting and bending a single metal plate such as aluminum. The fixing portion 2i is formed to protrude at a right angle inwardly from the respective lower end of the left and right side plates 2b, 2c. The fixing portion 2i is formed with a through-hole 2j for passing through a screw 7 (FIG. 2). The seat plate configuring the fixed portion 2i is mounted on the upper surface of the main body 101. In this specification, "front", "back", "left", and "right" are used for convenience, and the front, back, left, and right may be either one.

A screw hole 101a is formed on the upper surface of the main body 101, at a position that matches a through-hole 2j. The first part 2 may be mounted and secured on the main body 101 by the screw 7 as shown in FIG. 2.

The second part 4 is provided with a lower front plate 4a, left and right lower side plates 4b, 4c, and locking portions 4e, 4f, 4g, 4h provided on each of the left and right lower side plates 4b, 4c. The second part 4 is formed by cutting and bending a single metal plate such as aluminum.

The third part 5 is provided with a top plate 5a, an upper front plate 5b, left and right upper side plates 5c, 5d, a lower protrusion piece 5e, and side protrusion pieces 5f, 5g. The third part 5 is formed by cutting and bending a single metal plate such as aluminum.

By engaging the locking portions 4e, 4f, 4g, 4h with the locked portions 2e, 2f, 2g, 2h respectively, the second part 4 is detachably attached to the first part 2.

The locked portions 2e, 2f, 2g, 2h of the first part 2 are provided in a plurality of stages spaced vertically (two stages in the illustrated embodiment). The locking portions 4e, 4f, 4g, 4h, corresponding to the locked portions 2e, 2f, 2g, 2h, are provided in a plurality of stages spaced vertically (two stages in the illustrated embodiment).

The locked portions 2e, 2f, 2g, 2h are protruding from the inside of each of the left and right side plates 2b, 2c, and formed in L-shape. The locking portions 4e, 4f, 4g, 4h are formed in inverted L-shape, and extend at right angles inwardly from the respective side edges of the left and right lower side plates 4b, 4c.

The locked portions 2e, 2f, 2g, 2h are bending formed such that outer surfaces of the locked portions 2e, 2f, 2g, 2h to be located on the same plane as the inner surface of the side plates 2b, 2c. The outer surfaces of the locking portions 4e, 4f, 4g, 4h are bending formed so as to be flush with side edges 4b1, 4c1 of the lower side plates 4b, 4c.

The locking portions 4e, 4f, 4g, 4h are engaged by sliding the second part 4 downward along the first part 2, and are disengaged by sliding the second part 4 upward along the first part 2. The L-shaped locked portions 2e, 2f, 2g, 2h and the inverted L-shaped locking portions 4e, 4f, 4g, 4h have the same plate thickness, and groove widths of recesses to be fitted to each other are substantially the same width as the plate thickness, thereby rattling is less likely to occur during engagement shown in FIG. 3.

Referring to FIG. 2, a width W1 of the second part 4 and a width W2 of the first part 2 are the same sizes. When the locking portions 4e, 4f, 4g, 4h are engaged with the locked portions 2e, 2f, 2g, 2h to attach the second part 4 to the first part 2, the lower side plates 4b, 4c and the side plates 2b, 2c of the first part 2 coincide to the side edges 4b1, 4c1 and side edges 2b1, 2c1 facing each other, each side surfaces of the side plates 2b, 2c and the lower side plates 4b, 4c are flush with each other as shown in FIGS. 3 and 4.

The top plate 5a of the third part 5 configures a top plate of the casing 1. The top plate 5a is mounted on a stay 2d provided at the upper portion of the first part 2, and screwed by screws 10 as shown in FIG. 4. The top plate 5a can be mounted on the side plates 2b, 2c at the same time as being mounted in the stay 2d. The third part 5 is attachable and detachable by attaching and detaching the screws 10.

Figure 3:
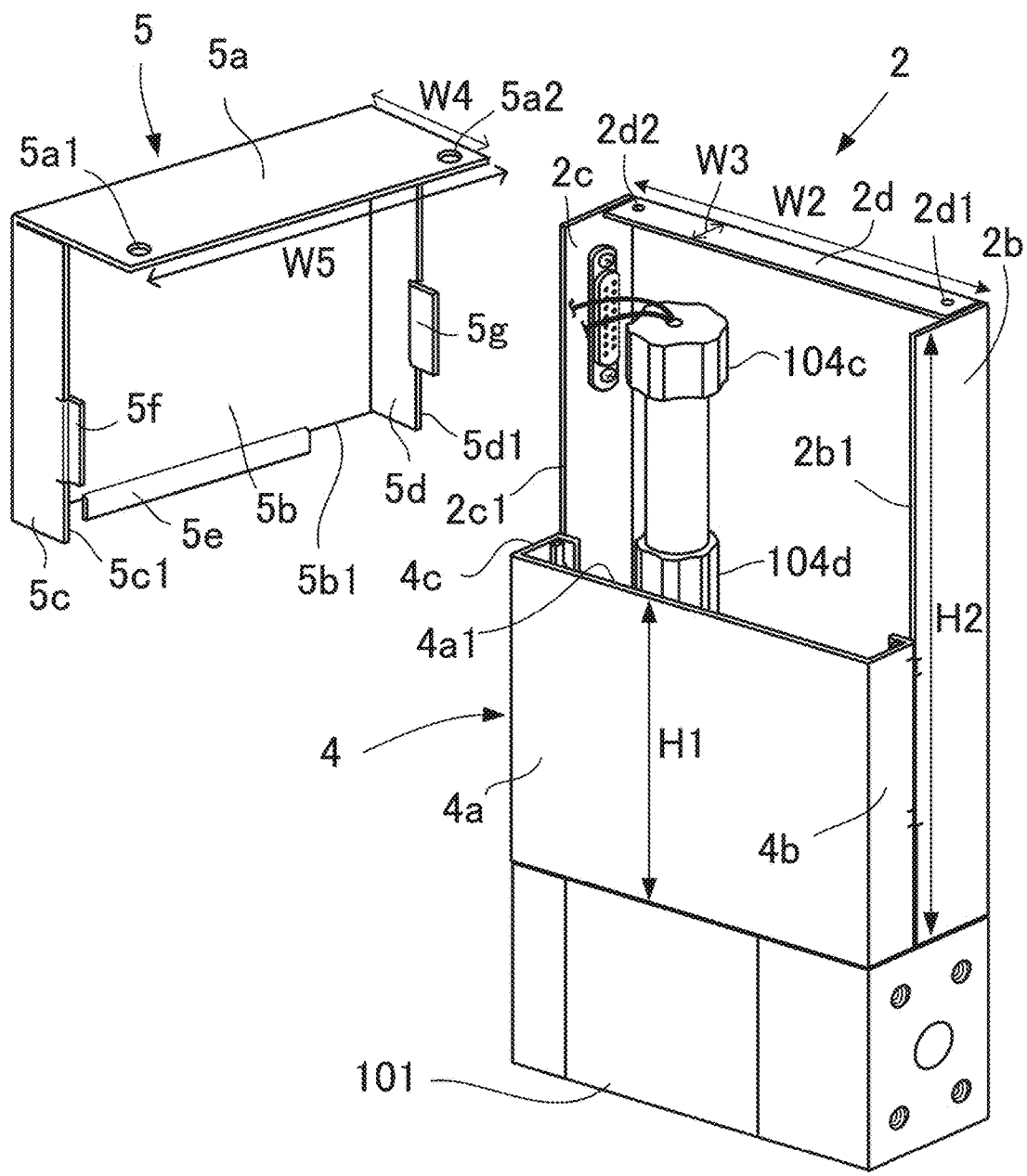
FIG. 3 is an exploded perspective view showing another exploded state of the casing for a fluid controller of FIG. 1.
Figure 4:
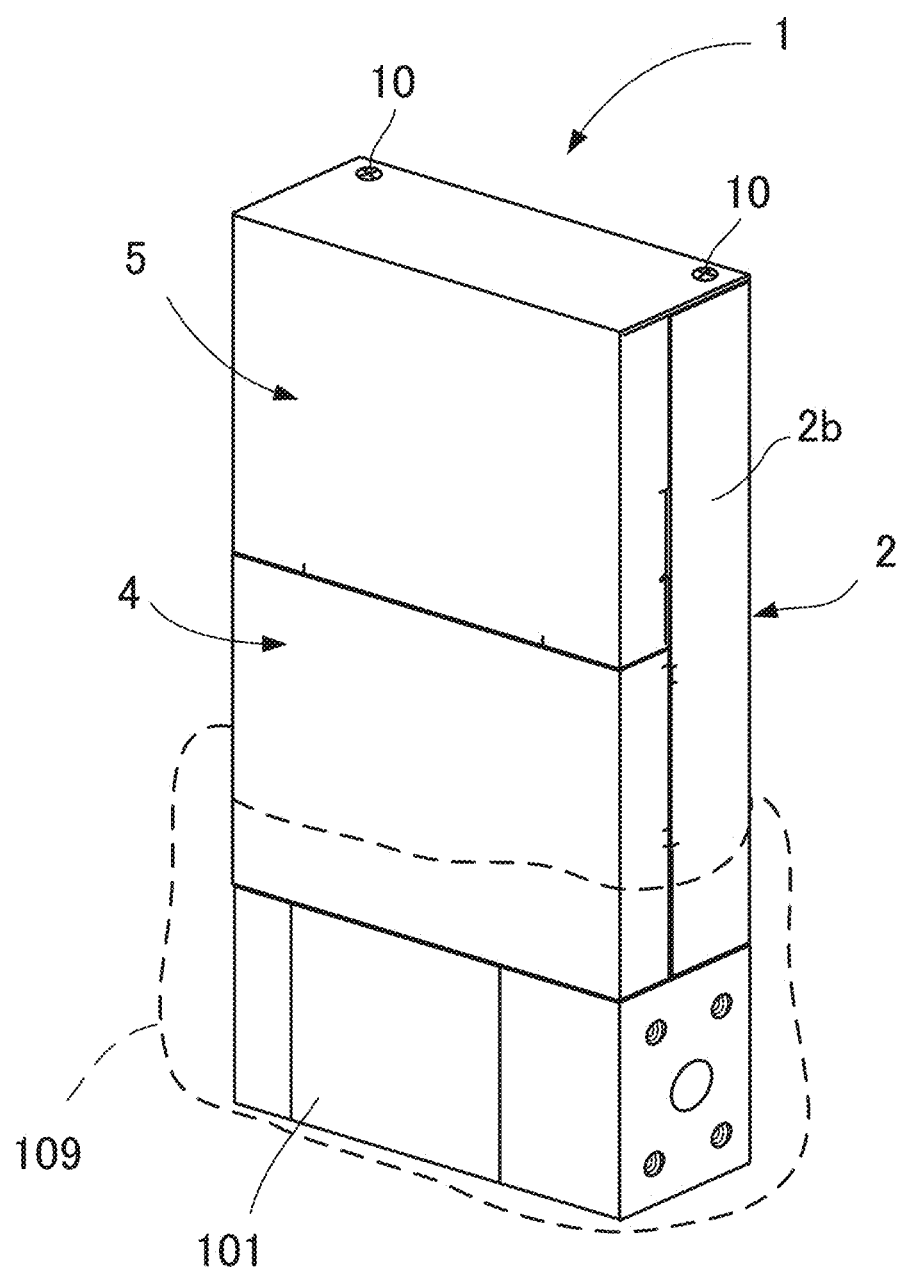
FIG. 4 is a perspective view showing a state after assembling the casing for a fluid controller of FIG. 1.

Referring to FIG. 3, tapered holes 5a1, 5a2 for passing the screws 10 are formed in the top plate 5a, and screw holes 2d1, 2d2 for screwing the screws 10 are formed in the stay 2d. The stay 2d is formed in a small area as compared with the top plate 5a, thereby it is easy to access the inside of the casing when removing the third part 5 from the first part 2. For example, a depth dimension W3 (FIG. 3) of the stay 2d may be less than half a depth dimension W4 of the top plate 5a.

A width W5 of the upper front plate 5b is the same dimension as the width W2 of the first part 2. Each of side edges 5c1, 5d1 of the upper side plates 5c, 5d is formed to match the side edges 2b1, 2c1 of the left and right side plates 2b, 2c of the first part 2. In addition, a lower edge 5b1 of the third part 5 is shaped to match an upper edge 4a1 of the second part 4.

The side protrusion pieces 5f, 5g are protruding from the sides of the third part 5. The side protrusion pieces 5f, 5g are formed so as to protrude, parallel to the upper side plates 5c, 5d, from the inner surfaces of the upper side plates 5c, 5d. The side protrusion pieces 5f, 5g abut on the inner surface of each of the side plates 2b, 2c of the first part 2, and may be guided. When attaching the third part 5 to the first part 2, by abutting the side protrusion pieces 5f, 5g on the inner surfaces of each of the left and right side plates 2b, 2c of the first part 2, the lateral positioning of the third part 5 becomes easier. It is also possible to provide only one of the side protrusion pieces 5f, 5g.

The lower protrusion piece 5e is formed so as to protrude downward from the lower inner surface of the upper front plate 5b. The lower protrusion piece 5e abuts on the inner surface of the lower front plate 4a of the second part 4, which is attached to the first part 2, and may be guided. When attaching the third part 5 to the first part 2, by guiding the lower protrusion piece 5e to the inner surface of the lower front plate 4a of the second part 4, the positioning in the front-back direction becomes easier, and the alignment of the lower edge 5b1 of the third part 5 and the upper edge 4a1 of the second part 4 in the front-back direction becomes easier. After attaching the second part 4 to the first part 2 by engaging the locking portions 4e, 4f, 4g, 4h to the locked portions 2e, 2f, 2g, 2h, if screwing the third part 5 to the first part 2 by screws 10, the second part 4 is prevented from sliding upward by the third part 5, the locking portions 4e, 4f, 4g, 4h of the second part 4 cannot be removed from the locked portion 2e, 2f, 2g, 2h of the first part 2. Therefore, screwing operation of the second part 4 is not necessary, and the number of assembly steps may be reduced.

According to the casing for a fluid controller having the above described structure, by removing the third part 5 from the first part 2, the tightness (screwing amount) of the piezo actuator 104 can be adjusted by accessing the adjustment cap-nut 104c screwed to the upper end portion of the piezo actuator 104. The height dimensions of the third part 5 and the second part 4 may be appropriately designed according to the dimensions of the device, such as the piezo actuator 104, mounted on the main body 101.

For example, it is more preferable to set the height dimensions of the third part 5 and the second part 4 to the extent that the amount of tightness (the screwing amount) of the adjustment cap-nut 104c can be adjusted, by placing a tool such as a spanner on an outer peripheral portion 104d, which has a non-circular cross-section, of the main body of the piezo actuator 104 (FIG. 3), and placing a tool such as another spanner to the adjustment cap-nut 104c. The maintenance operation can be performed more easily by making a height dimension H1 of the second part 4, for example, to ½ to ¼ of a height dimension H2 of the first part 2.

Further, even when the main body 101 of the fluid controller 100 is covered by a heat insulating material 109 (shown as a broken line in FIG. 4), it is possible to perform equipment maintenance such as adjusting the tightness of the adjustment cap-nut 104c (stroke adjustment) by removing only the third part 5 from the first part 2, without removing the heat insulating material 109. In addition, there is a case where an aluminum panel heater (not shown) is attached to the periphery of the main body 101 of the fluid controller 100, and the aluminum panel heater is covered with the heat insulating material 109.

Since only the third part 5 is removed from the first part 2, and the entire casing for a fluid controller 1 does not need to be removed from the main body 101, the adjustment of the amount of tightness of the adjustment cap-nut 104c and other maintenance of the inside of the casing can be performed while maintaining the heat insulating state by the heat insulating material 109 and the like to some extent, so it is possible to perform the adjustment and other maintenance taking thermal characteristics under consideration.

Figure 5:
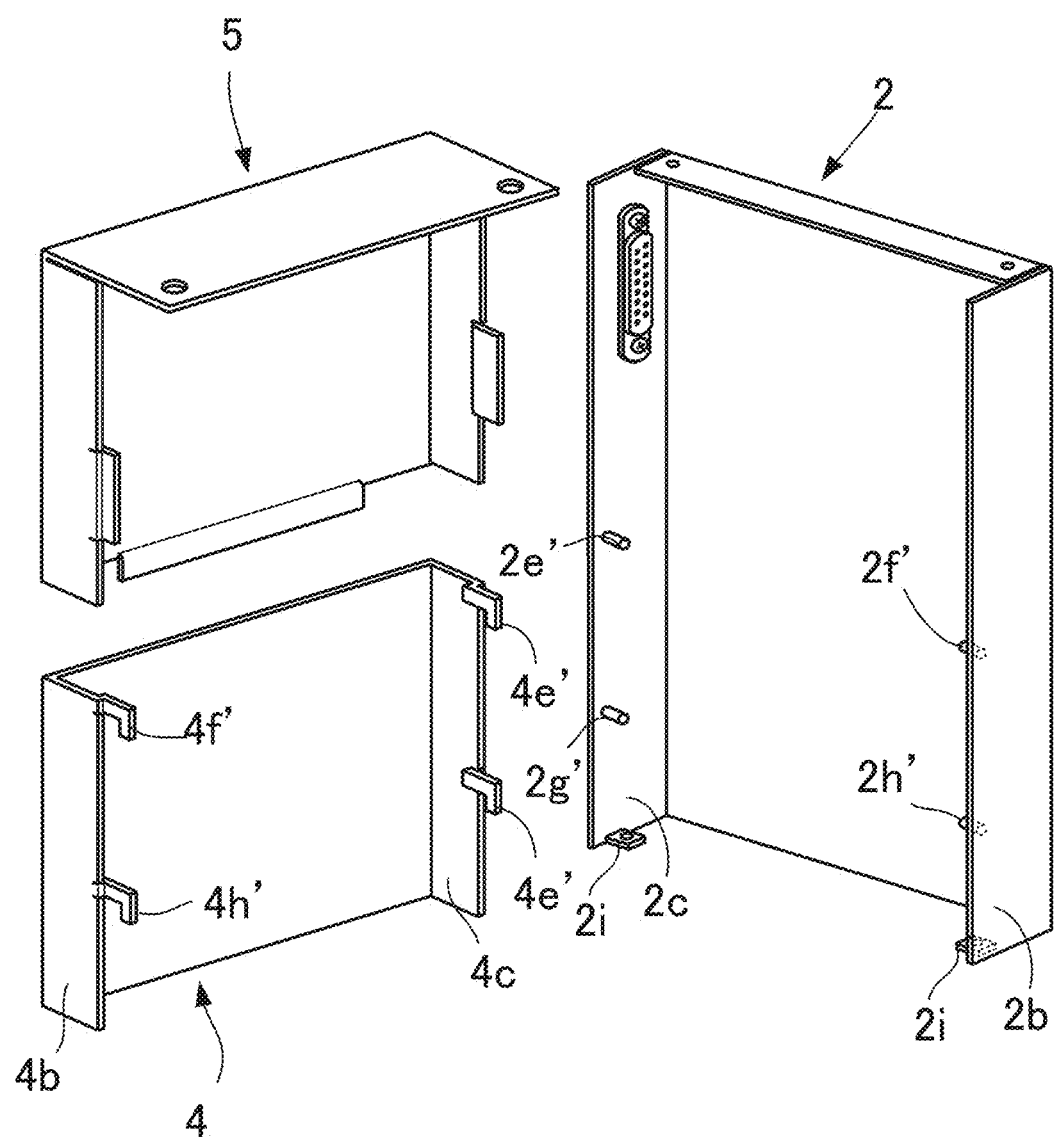
FIG. 5 is an exploded perspective view showing a second embodiment of the casing for a fluid controller according to the present invention.

FIG. 5 shows a second embodiment of the casing for a fluid controller according to the present invention. As shown in FIG. 5, the casing for a fluid controller of the second embodiment is different from that of the first embodiment by the feature that locking portions 4e', 4f, 4g', 4h' are inverted L-shaped protruding from the lower side plates 4b, 4c and parallel to the lower side plates 4b, 4c, and locked portions 2e', 2f, 2g', 2h' are in the form of pins protruding on the inner surfaces of the side plates 2b, 2c. Other configurations of the second embodiment are the same as that of the first embodiment.

Figure 6:
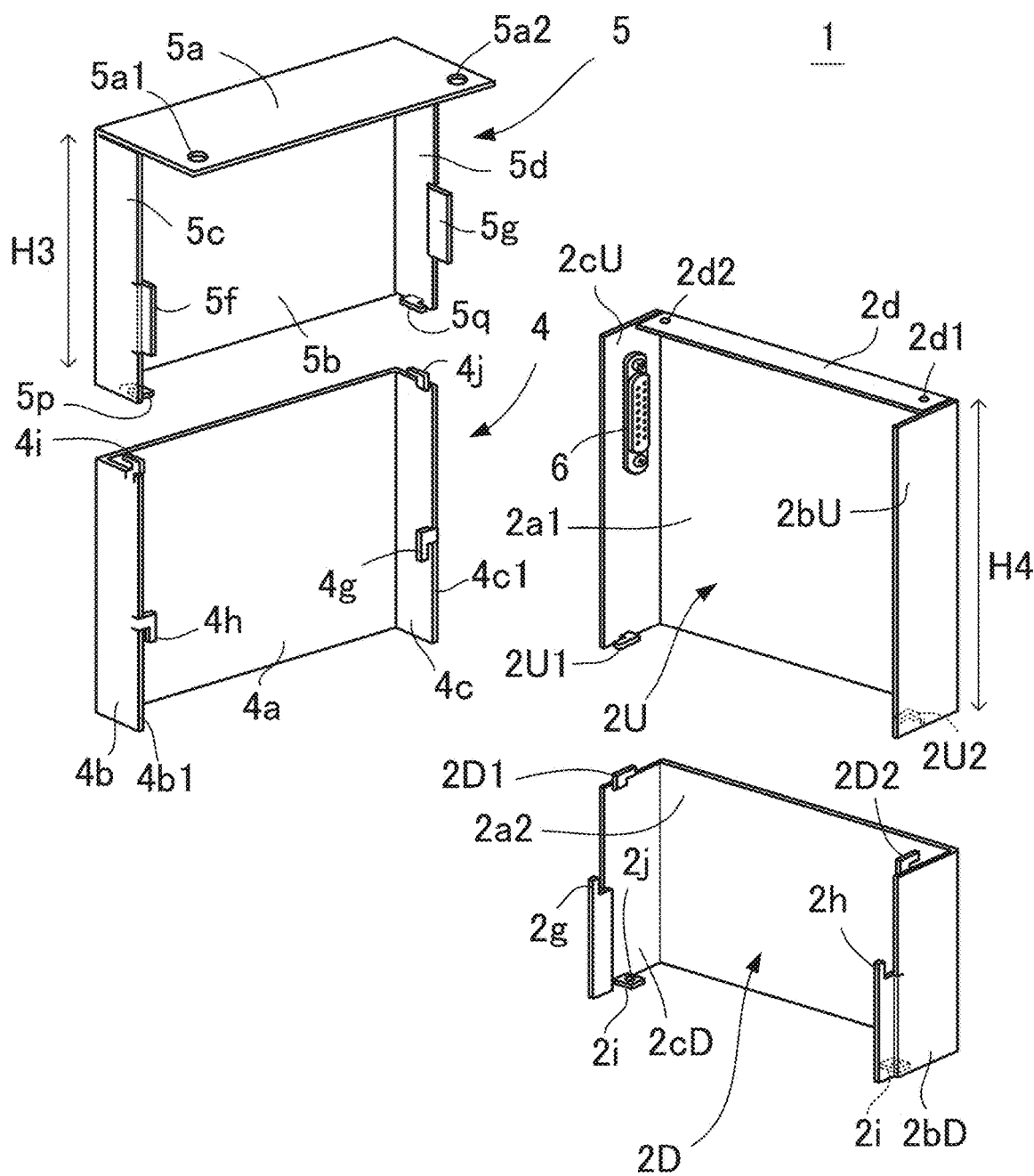
FIG. 6 is an exploded perspective view of the casing for a fluid controller according to a third embodiment of the present invention.

Next, a third embodiment of the casing for a fluid controller according to the present invention will be described with reference to FIG. 6. In the third embodiment, the part corresponding to the first part 2 of the first embodiment is configured to be dividable into upper and lower parts, which are a fourth part 2D having a fixing portion 2i, and a fifth part 2U provided detachably on top of the fourth part 2D.

In this case, each of locking portions 2D1, 2D2 provided on the fourth part 2D, is respectively engaged with locked portions 2U1, 2U2 provided on the fifth part 2U. The locking portions 2D1, 2D2 are protruding upward from upper ends of the inner surfaces of left and right lower side plates 2cD, 2bD. The locked portions 2U1, 2U2 are protruding inward at right angles from the lower ends of the inner surfaces of left and right upper side plates 2cU, 2bU. By placing and sliding the fifth part 2U on the fourth part 2D, it is possible to engage the locking portions 2D1, 2D2 with the locked portions 2U1, 2U2. By engaging the locking portions 2D1, 2D2 with the locked portions 2U1, 2U2, an upper back plate 2a1 is flush with a lower back plate 2a2, and the lower side plates 2cD, 2bD are flush with the upper side plates 2cU, 2bU.

Further, locking portions 4i, 4j provided on the lower side plates 4b, 4c of the lower front plate 4 and locked portions 5p, 5q provided on the upper side plates 5c, 5d of the upper front plate 5 are engaged respectively. The locking portions 4i, 4j are protruding upward from the upper ends of the inner surfaces of the left and right lower side plates 4b, 4c. The locked portions 5p, 5q are protruding inward at right angles from the lower ends of the inner surfaces of the left and right upper side plates 5c, 5d. By placing and sliding the third part 5 on the second part 4, it is possible to engage the locking portions 4i, 4j with the locked portions 5p, 5q. By engaging the locking portions 4i, 4j with the locked portions 5p, 5q, the lower front plate 4a is flush with the upper front plate 5b, and the lower side plates 4b, 4c are also flush with the upper side plates 5c, 5d.

By configuring a height dimension H3 of the third part 5 and a height dimension H4 of the fifth part 2U at different sizes, removing the third part 5 or removing the fifth part 2U can be selected depending on the equipment that needs to be maintained. Height dimensions of the second part 4 and the forth part 2D can be appropriately set depending on the device to be mounted on the fluid controller. The height dimension H3 is set shorter than the height dimension H4.

In the third embodiment, the fixed portion 2i of the fourth part 2D is screwed to the main body 101 of the fluid controller. Then, by placing and sliding the fifth part 2U on the fourth part 2D to engage the locking portions 2D1, 2D2 with the locked portions 2U1, 2U2, the fifth part 2U is detachably joined with the fourth part 2D. Next, by engaging the locking portions 4g, 4h of the second part 4 with the locked portions 2g, 2h of the fourth part 2D, the second part 4 is detachably attached to the fourth part 2D. Then, by placing and sliding the third part 5 on the second part 4 to engage the locking portions 4i, 4j with the locked portions 5p, 5q, the third part 5 is joined with the second part 4, and the third part 5 is abutted on the fifth part 2U. In addition, the holes 5a1, 5a2 overlap each other with the screw holes 2d1, 2d2 and screwed by screws (not shown). By this screwing, the engagement between the locking portions 2D1, 2D2, 4g, 4h, 4i, 4j and the locked portions 2U1, 2U2, 2g, 2h, 5p, 5q is configured not to disengage. On the other hand, the fifth part 2U or the third part 5 can be removed by unscrewing the screwed screws.

Figure 7:
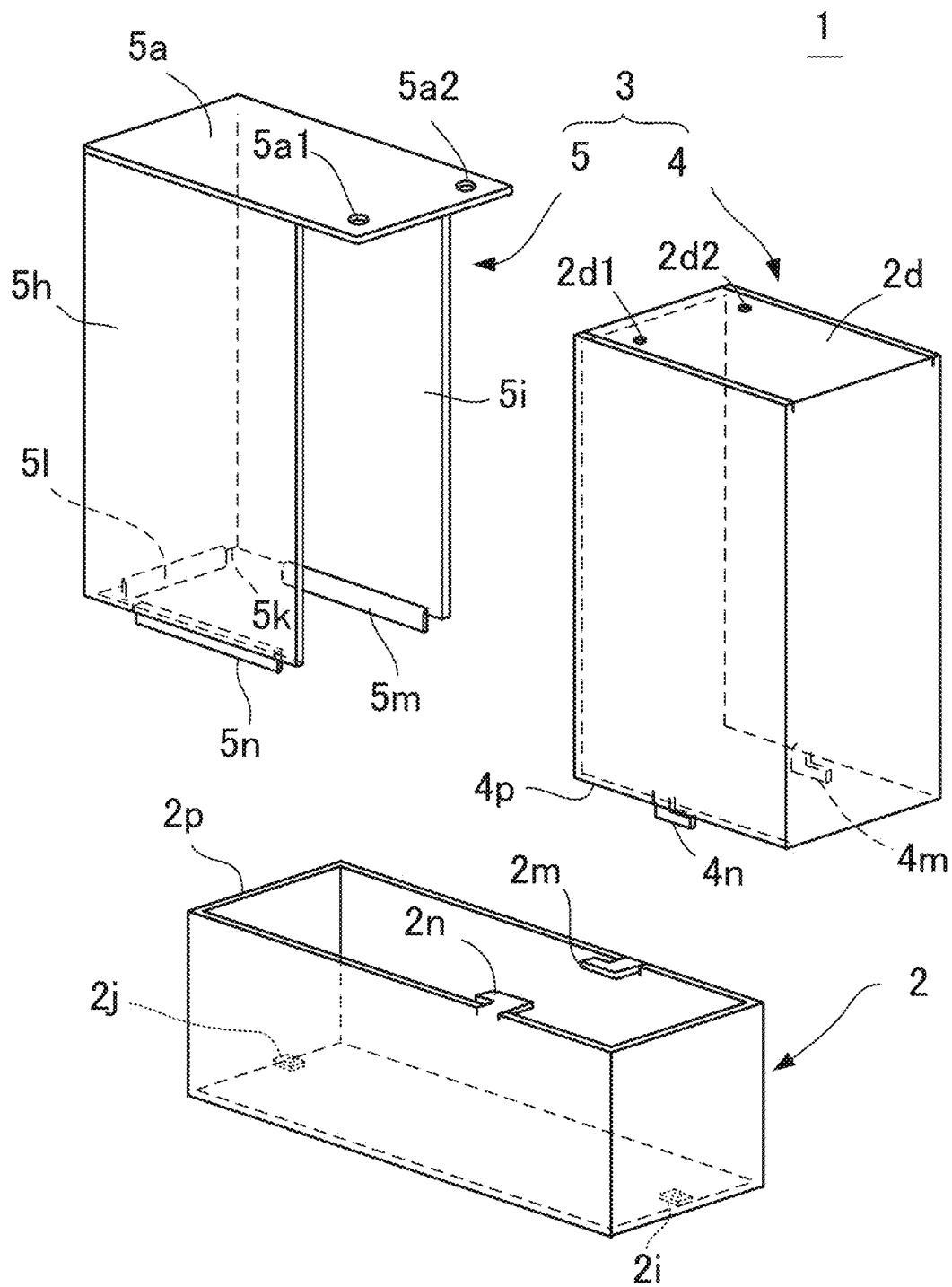
FIG. 7 is an exploded perspective view of the casing for a fluid controller according to a fourth embodiment of the present invention.

Next, a description will be given with reference to FIG. 7 for a fourth embodiment of the casing for a fluid controller according to the present invention. In the casing for a fluid controller 1 of the fourth embodiment, the first part 2 is a lower part when the casing 1 is dividable into upper and lower parts, the second part 4 and the third part 5 are parts by longitudinally dividing the upper part 3 of the casing 1 that is divided by the first part 2.

Locking portions 4m, 4n are formed in the second part 4. Locked portions 2m, 2n, which are engaged by locking portions 4m, 4n, are provided in the first part 2. The locking portions 4m, 4n are engaged with the locked portions 2m, 2n by placing a lower edge 4p of the second part 4 on an upper edge 2p of the first part 2 and sliding the second part 4.

On the third part 5, lower protrusion pieces 5l, 5m, 5n that are protruding downward are formed respectively from each of side plates 5h, 5i, which are facing each other, and a side plates 5k perpendicular to the side plates 5h, 5i. The lower protrusion pieces 5l, 5m, 5n are guided to and abutted on the inner wall surface of the first part 2. The lower protrusion pieces 5l, 5m, 5n are also the positioning of the third part 5 with respect to the first part 2. By joining the third part 5 to the second part 4 while the lower protrusion piece 5l is in contact with the inner wall surface of the first part 2, the sliding of the second part 4 is limited, the locking portions 4m, 4n of the second part 4 are prevented from disengaging from the locked portions 2m, 2n of the first part 2. Although not shown, as the side protrusion piece 5g, 5f of the first embodiment, side protrusion pieces protruding from the side plates 5h, 5i may also be provided sideward.

When the third part 5 is thus joined with the first part 2 and the second part 4, the holes 5a1, 5a2 provided in the top plate 5a and the screw holes 2d1, 2d2 provided in the stay 2d overlap each other, and screws (not shown) can be used to screw the third part 5 to the second part 4. By this screwing, the second part 4 becomes unremovable from the first part 2.

Dimensions such as a height dimension of the first part 2 and vertical/horizontal dimensions of the second part can be appropriately configured depending on the type and dimension of the device to be mounted on the fluid controller.

Next, a fifth embodiment of the casing for a fluid controller according to the present invention will be described with reference to FIG. 8. The casing for a fluid controller 1 of the fifth embodiment is a modification of the fourth embodiment, in which the third part 5 is configured to be fixed to the first part 2 by screwing.

Figure 8:
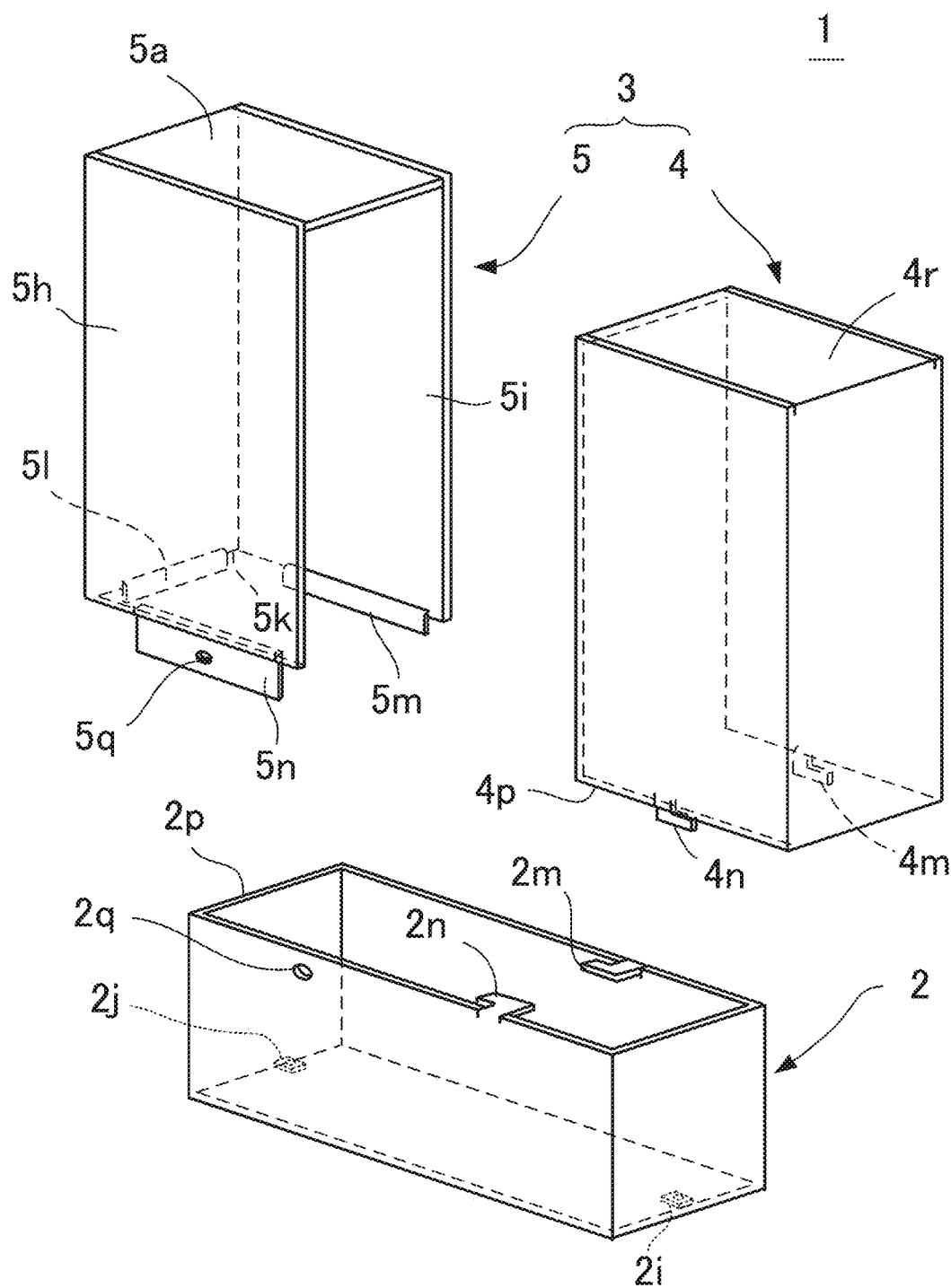
FIG. 8 is an exploded perspective view of the casing for a fluid controller according to a fifth embodiment of the present invention.

Referring to FIG. 8, a hole 2q for passing a screw (not shown) is formed in a side surface of the first part 2, and a screw hole 5*q* is formed in a lower protrusion piece 5*n* of the third part 5. By placing and sliding the second part 4 on the first part 2 to engage the locking portions 4*m*, 4*n* of the second part 4 with the locked portions 2*m*, 2*n* of the first part 2, placing the third part 5 on the first part 2 while joining the second part 4, and screwing a screw (not shown) into the screw hole 5*q* through the hole 2*q*, the third part 5 is fixed by screwing to the first part 2, sliding movement of the second part 4 is restricted, and the locking portions 4*m*, 4*n* becomes unremovable from the locked portions 2*m*, 2*n*. By unscrewing the screw that fixing the third part 5 to the first part 2, it is possible to perform maintenance for the inside of the casing by removing only the third part 5 from the first part 2. A top plate 4*r* of the second part 4 and the top plate 5*a* of the third part 5 can be designed to be the same height at the time of assembly.

The casing for a fluid controller according to the present invention is not limited to the above embodiments, and various modifications are possible without departing from the scope of the present invention. For example, in order to configure so that the locking portions do not disengage from the locked portions by screwing the third part, the position providing the locking portions and the locked portions, the protrusion pieces, and the embodiment of the dividable portions can be changed as appropriate. Further, the above embodiments have exemplified a structure for locking by the locking portions, a structure for fixing by a fastening member such as a bolt is also possible.

REFERENCE SIGNS LIST

1 Casing for a fluid controller
2 First part
2*a* Back plate
2*b*, 2*c* Side plate
2*d* Stay
2*e*, 2*f*, 2*g*, 2*h* Locking portion
2*e'*, 2*f'*, 2*g'*, 2*h'* Locked portion
2*i* Fixing portion
2D Fourth part
2U Fifth part
4 Second part
4*a* Lower front plate
4*b*, 4*c* Lower side plate
4*e*, 4*f*, 4*g*, 4*h* Locking portion
4*e'*, 4*f'*, 4*g'*, 4*h'* Locked portion
5 Third part
5*a* Top plate
5*b* Upper front plate
5*c*, 5*d* Upper side plate
5*f*, 5*g* Side protrusion piece
5*e* Lower protrusion piece
100 Fluid controller
101 Main body
104 Piezo actuator
104*c* Adjustment cap-nut

The invention claimed is:

1. A casing for a fluid controller to cover devices on a main body of the fluid controller, comprising:
    a first part provided with a fixing portion for fixing to the main body, the first part having a back plate, a pair of side plates formed on left and right sides of the backplate, and a stay formed on top of the back plate;
    a second part attached to the first part, the second part having a lower front plate, and a pair of lower side plates formed on left and right sides of the lower front plate; and
    a third part attachably and detachably arranged at an upper portion of the casing higher than a predetermined height position of the casing, the third part having an upper front plate, a pair of upper side plates formed on left and right sides of the upper front plate, and a top plate formed on top of the upper front plate, the third part being arranged on top of the second part, the top plate being placed and detachably fixed on the stay,
    wherein the casing is configured to be dividable into the first part, the second part, and the third part, and
    wherein a side edge of each of the pair of the lower side plates abuts a corresponding side edge of one of the pair of side plates of the first part, and a side edge of each of the pair of the upper side plates abuts the corresponding side edge of one of the pair of the side plates of the first part, to form side surfaces of the casing.

2. The casing for a fluid controller according to claim 1, wherein the first part is configured to be dividable into a fourth part provided with the fixing portion, and a fifth part attachably and detachably arranged on top of the fourth part.

3. The casing for a fluid controller according to claim 2, wherein
    height dimensions of the third part and the fifth part are different.

4. The casing for a fluid controller according to claim 1, wherein
    the first part is provided with a locked portion;
    the second part is provided with a locking portion for detachably attaching the second part to the first part by engaging the locked portion,
    the locked portion protrudes from an inside of one of the side plates of the first part and has an L-shape,
    the locking portion has an inverted L-shape and extends at a right angle inwardly from one of the side edges of one of the lower side plates, and
    the locking portion is configured to engage the locked portion by sliding the second part downward along the first part, and to disengage the engagement by sliding the second part upward along the first part.

5. The casing for a fluid controller according to claim 1, wherein
    the first part and the second part are detachably attached by engagement, the engagement being configured so as not to disengage by fixing the third part to either the first part or the second part.

6. A fluid controller comprising:
    a main body having a flow path formed therein;
    devices for fluid control mounted on the main body; and
    a casing for the fluid controller according to claim 1, for covering the devices fixed to the main body.

7. The casing for a fluid controller according to claim 1, wherein the fluid controller has a valve, and the casing covers the valve.

8. The casing for a fluid controller according to claim 7, wherein the valve is a piezoelectric drive valve.

9. The casing for a fluid controller according to claim 7, wherein the valve is mounted on the main body.

* * * * *